United States Patent Office 3,576,838
Patented Apr. 27, 1971

3,576,838
METHOD OF PURIFYING HALOFORMATES
John L. Urness, North Muskegon, and Larry L. Filius, Muskegon, Mich., assignors to CPC International Inc.
No Drawing. Filed Feb. 26, 1969, Ser. No. 802,664
Int. Cl. C07c 69/64
U.S. Cl. 260—463
13 Claims

ABSTRACT OF THE DISCLOSURE

Covers a method of purifying haloformate. Particularly covers a method of preventing decomposition of haloformates due to presence of iron contaminates by contacting the haloformate with an aqueous alkali metal halide solution whereby the iron content of the organic haloformate phase is substantially reduced. The resultant aqueous phase is then separated from the organic phase. In an alternate procedure an acidic haloformate such as an alkyl haloformate is treated with an alkali metal base such as an aqueous sodium hydroxide solution whereby the haloformate is both neutralized and an alkali metal halide generated which effects substantial reduction of the iron content in the organic haloformate phase.

---

Perhaps the simplest and most economical method of synthesizing haloformates, such as alkyl chloroformates is by reaction of phosgene or its analogues with an alcohol. Most frequently, reaction of this type is carried out between phosgene and a lower alkanol, such as ethanol, methanol, isopropyl alcohol, etc. Usually, the resultant alkyl chloroformate product is then distilled to achieve a completely purified product.

However, during the distillation step a serious problem arises. Commercial phosgene normally has present minor amounts of iron in the form of ferric chloride. The iron contaminants are carried through in the reaction with alcohol and are thus present in the alkyl chloroformate product. During distillation presence of the iron, along with application of heat causes the alkyl chloroformate to severely decompose either to olefinic compounds or to alkyl chlorides. A substantial amount of product is lost, and/or in many cases the alkyl chloroformates are completely decomposed. While one solution is to start with a purified phosgene, free of iron contamination, such purification of phosgene would be a costly and difficult procedure.

In view of the above, it therefore becomes an object of the invention to provide a method of purifying by distillation haloformates containing iron contaminants.

A specific object of the invention is to prevent decomposition of iron-contaminated alkyl haloformates during the purifying distillation step.

Another object of the invention is to provide a method of preventing decomposition during distillation of alkyl chloroformates, such as ethyl chloroformate, which normally decompose during said step, due to presence of ferric chloride as a contaminant which causes said decomposition.

Yet another object of the invention is to provide the above method of preventing decomposition via a facile method, involving little additional process cost.

Other objects will appear hereinafter.

In accordance with the invention a method of purifying haloformates has been discovered. Specifically, a method of removing iron contaminants causing said decomposition of haloformates has been found whereby the iron content of the haloformate is substantially reduced. In its broadest aspects the invention comprises the steps of contacting the iron-contaminated haloformate with an aqueous alkali metal halide solution whereby said iron content of the organic haloformate phase is substantially reduced. Then the resultant aqueous phase is separated from the now purified organic haloformate phase. In an alternate procedure the haloformate which is acidic due to presence of dissolved acid such as hydrochloric is treated with an alkali metal hydroxide solution. Here, simultaneous with neutralization of the acidic haloformate, an alkali metal halide is generated which then effects the reduction of the iron content of the haloformate liquid. The thus purified haloformate may then be further purified by distillation since the iron contaminants normally causing decomposition during distillation have been substantially reduced in content.

The invention is applicable to prevention of decomposition of any haloformate which is susceptible to decomposition during distillation due to presence of iron contaminants, particularly ferric chloride. Thus, any aromatic or aliphatic haloformate which is being purified by distillation may be treated with an alkali metal halide here to prevent decomposition. The invention is particularly applicable to preventing decomposition of alkyl chloroformates, such as ethyl chloroformate, methyl chloroformate, isopropyl chloroformate, n-butyl chloroformate, t-butyl chloroformate, etc. Of the latter group ethyl chloroformate is a typical alkyl chloroformate treated here since it normally severely decomposes during distillation due to the iron contaminant acting as a decomposition catalyst.

Generally, haloformates such as alkyl chloroformate susceptible to decomposition contain from about 50 p.p.m. to about 500 p.p.m. of iron, expressed as Fe. One particular species causing the decomposition is believed to be ferric chloride.

As just noted, the alkali metal chloride such as sodium chloride used to rid the haloformate of iron contamination may be added as such or generated in situ. In addition to sodium chloride other alkali metal halides such as potassium chloride, sodium bromide, etc. may be used.

Thus, if the haloformate liquid is essentially neutral, say having a pH range of 6–8, an alkali metal halide aqueous solution is added directly to the haloformate undergoing purification by this treatment. If, on the other hand, the haloformate is acidic, falling within a pH range of from about 1 to about 6 a base such as a sodium hydroxide solution is added. This both neutralizes the acidic haloformate and generates the necessary alkali metal halide to thus rid the haloformate of unwanted iron contaminants. Other bases such as potassium hydroxide may be used with equal facility.

Generally sufficient sodium chloride is either generated or added to the iron contaminated haloformate to effect the desired purification. Usually the amount of sodium chloride present is from about 0.1 mole sodium chloride to about 1.0 mole sodium chloride per mole of haloformate. More often 0.2–0.5 mole of sodium chloride is added or generated per mole of haloformate such as ethyl chloroformate or other alkyl chloroformates.

The concentration of the alkali metal halide or alkali metal hydroxide solution may vary somewhat. Good results are achieved when the concentration of alkali metal chloride such as sodium chloride ranges from about 15% to about 25% per weight. When the haloformate is acidic and an alkali metal hydroxide is used such as sodium hydroxide the concentration may range from about 5% to about 20% by weight of alkali metal hydroxide.

When either of the above procedures are employed, the choice depending upon the acidity of the haloformate, the iron content expressed as Fe may be reduced to below about 20 p.p.m. It is believed that a haloformate containing this amount of iron can be safely distilled with little decomposition. In most instances, the iron content can be reduced below about 5 p.p.m. of iron, expressed as Fe, and in many instances below about 2 p.p.m.

It is not completely understood how the presence of sodium chloride aids in removing the iron species from the haloformates and placing them in the aqueous phase. It was particularly surprising to note the same effect of iron removal, as just described cannot be accomplished through use of water alone. Again, when sodium hydroxide is added to a neutral chloroformate liquid, and thus no sodium chloride generated, little iron contamination was subsequently found removed. It is thought that the sodium chloride somehow aids in complexing the iron such as ferric chloride, thus effectuating the removal from the organic phase into the aqueous phase.

The time of contact of sodium chloride with impure haloformate may widely vary depending upon concentration of the sodium chloride being utilized, size of the batch of haloformate being purified, temperature, and other variables. For example, a countercurrent extraction type of procedure may be utilized in which the contact time is quite short. In other cases the alkali metal halide added or generated present in the aqueous phase may be mixed with the haloformate for a time ranging from about 10 minutes to about 120 minutes. Generally during contact of the aqueous phase and organic phase vigorous agitation is effected.

Again, the temperature during the contact of aqueous phase and organic phase may vary somewhat. Usually, the treatment is effected at a temperature ranging from about 20° C. to about 50° C.

After the period of treatment is over, the phases are allowed to separate and the lower aqueous phase then drained off from the haloformate.

Thus, by carrying out purification of haloformates according to the process of the invention one may substantially reduce decomposition of the haloformates normally found during their further purification by distillation. In fact, yields as high as 98% haloformate after distillation may be achieved, based on the weight of haloformate present before distillation when the haloformate has been treated as just described. On the other hand, without removal of iron contamination a batch of haloformate such as alkyl chloroformate, typically ethyl chloroformate, may decompose severely, wherein only 10-20% of the chloroformate remains after distillation.

The following examples illustrate the method of the invention. It is understood, of course, that these examples are merely illustrative, and that the invention is not limited thereto. All parts and percentages are by weight.

EXAMPLE I

To one mole of ethyl chloroformate containing 500 p.p.m. of iron and about 0.1 mole of HCl was added 0.1 mole of a 20% aqueous solution of sodium hydroxide at about 25° C. The aqueous and organic phases were stirred together for about ½ hour and then separated. The iron content in the ethyl chloroformate had been reduced to about 10-20 p.p.m. and was able to be distilled without decomposition.

In a comparative test ethyl chloroformate containing 200 p.p.m. of ferric chloride was refluxed five hours. After this amount of time only 18% of the untreated ethyl chloroformate remained as such. The rest of the ethyl chloroformate had decomposed to other unwanted products.

EXAMPLE II

Here the iron contaminated ethyl chloroformate sample of Example I was first sparged with nitrogen to remove the dissolved hydrochloric acid. At the end of the sparging the hydrochloric acid content was less than about 0.01 mole. The essentially neutral ethyl chloroformate was then treated with 100 ml. of a 20% solution of sodium chloride. The two phases were stirred for about ½ hour at about 25° C. and then separated. Again, the ethyl chloroformate treated according to the process of the invention could then be ditilled without any decomposition taking place.

EXAMPLE III

Here an essentially neutral ethyl chloroformate was treated with pure water in the manner outlined in Example II above. The iron content was only reduced to about 200 p.p.m. of iron expressed as Fe and extensive decomposition of the resultant ethyl chloroformate took place when it was distilled. The same poor results were obtained when an essentially neutral ethyl chloroformate was treated with a sodium hydroxide solution. Again, the resultant product when distilled extensively decomposed.

The materials produced via the process of the invention are commercial products having known uses. Haloformates such as alkyl haloformates are well known intermediates for pharmaceuticals. For example, ethyl chloroformate is used as an intermediate in making a particular cough syrup. When employed for such uses, it is imperative that the haloformates, and particularly alkyl chloroformates, be in a completely pure form. Thus, it can be seen that by carrying out the invention here one can thus supply such pure form of alkyl chloroformates by distillation without sacrifice of yield.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. A method of preventing decomposition of haloformates which contain iron contaminants causing said decomposition which comprises the steps of contacting said haloformate with an aqueous alkali metal halide solution whereby the iron content of said organic haloformate phase is substantially reduced, and separating the resultant aqueous phase from the organic phase.

2. The method of claim 1 wherein said haloformate is an alkyl chloroformate which contains ferric chloride as a contaminant causing said decomposition.

3. The method of claim 2 wherein said alkyl chloroformate prior to treatment contains from about 50 p.p.m. to about 500 p.p.m. ferric chloride, expressed as Fe.

4. The method of claim 2 wherein said alkyl chloroformate is ethyl chloroformate.

5. The method of claim 1 wherein said haloformate undergoing treatment is essentially neutral.

6. The method of claim 2 wherein said aqueous alkali metal halide solution is an aqueous sodium chloride solution.

7. The method of claim 6 wherein said aqueous sodium chloride solution contains from about 15% to about 25% by weight of sodium chloride.

8. A method of preventing decomposition of haloformates which contain iron contaminants causing said decomposition which comprises the steps of contacting an acidic haloformate solution with an aqueous alkali metal hydroxide solution whereby an alkali metal halide is generated simultaneous with neutralization of said acidic haloformate, and whereby the iron content of said organic haloformate phase is substantially reduced due to presence of said alkali metal halide, and separating the resulting aqueous phase from the organic phase.

9. The method of claim 8 wherein said haloformate is an alkyl chloroformate which contains ferric chloride as a contaminant causing said decomposition.

10. The method of claim 9 wherein said alkyl chloroformate contains from about 50 p.p.m. to about 500 p.p.m. ferric chloride, expressed as Fe.

11. The method of claim 9 wherein said alkyl chloroformate is ethyl chloroformate.

12. The method of claim 9 wherein said aqueous alkali metal hydroxide solution is an aqueous solution of sodium hydroxide.

13. The method of claim 12 wherein said aqueous sodium hydroxide solution contains from about 5% to about 20% by weight of sodium hydroxdie.

References Cited

UNITED STATES PATENTS 1,603,689  7/1924  Hammond _____ 260—463

LEWIS GOTTS, Primary Examiner

D. G. RIVERS, Assistant Examiner